(No Model.)
J. PAINCHAUD & J. GODBOUT.
METHOD OF MAKING SHOES.
No. 391,068. Patented Oct. 16, 1888.
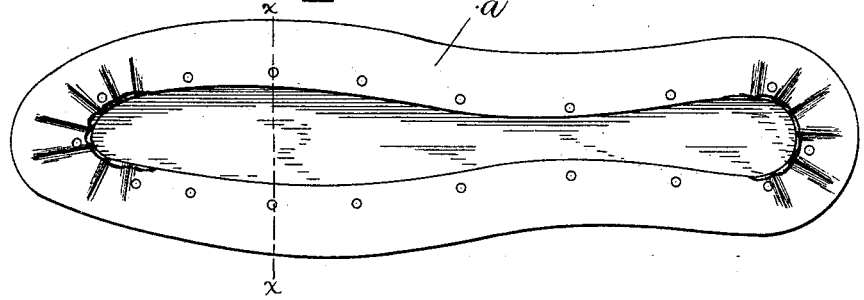
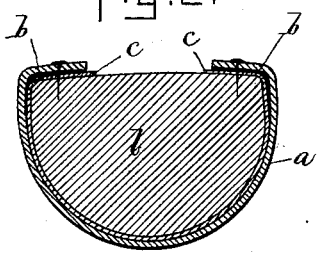 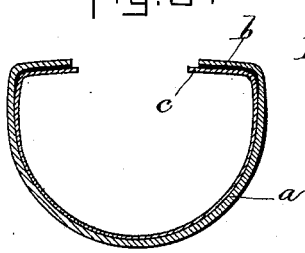 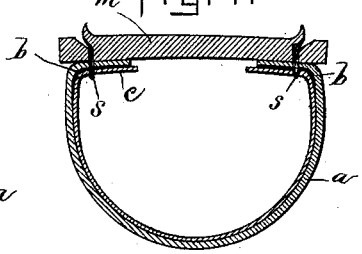
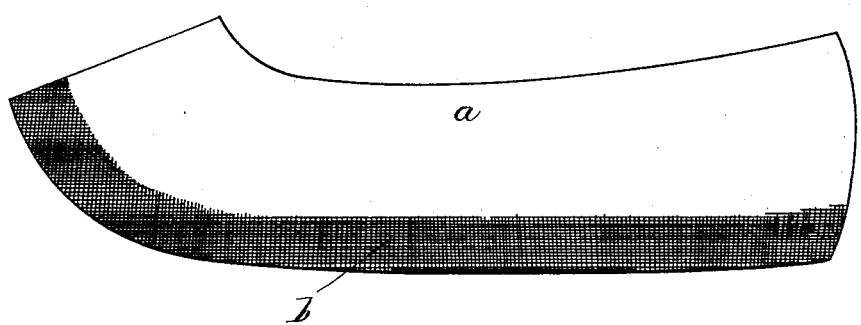

UNITED STATES PATENT OFFICE.

JOSEPH PAINCHAUD AND JOSEPH GODBOUT, OF HAVERHILL, MASSACHUSETTS.

METHOD OF MAKING SHOES.

SPECIFICATION forming part of Letters Patent No. 391,068, dated October 16, 1888.

Application filed April 11, 1888. Serial No. 270,266. (No model.)

*To all whom it may concern:*

Be it known that we, JOSEPH PAINCHAUD and JOSEPH GODBOUT, of Haverhill, in the county of Essex and State of Massachusetts, have invented certain new and useful Improvements in the Method of Making Shoes, of which the following is a specification.

This invention has for its object to provide an improved method of making shoes without inner soles; and it consists in first applying cement to the edges of the upper, then lasting the upper and turning its cement-coated edges over upon the bottom of the last; then, after the cement has hardened and thereby stiffened the inwardly-turned edges of the upper, removing the upper from the last and stitching an outer sole to the cement-stiffened edges of the upper, shape imparted to the upper by the lasting process being retained by the cement stiffening, so that the inner sole is not required to hold the edges of the upper during the operation of stitching it to the outer sole.

Of the accompanying drawings, forming a part of this specification, Figure 1 represents a bottom view of a last and an upper thereon. Fig. 2 represents a section on line $x\ x$, Fig. 1. Fig. 3 represents a section showing the upper removed from the last. Fig. 4 represents a section showing the upper and sole connected. Fig. 5 represents a side view of the upper before lasting.

The same letters of reference indicate the same parts in all the figures.

In carrying out our invention we take a shoe-upper, $a$, ready for lasting, and apply to the portions thereof that are to be turned over upon the bottom of the last a coating, $b$, of cement or glue, said coating being indicated by the shaded portion on Fig. 5 and by the heavy black line between the upper and its lining $c$ in Figs. 2, 3, and 4. The cement thus applied secures edges of the lining and of the upper together, so that the lining cannot be moved or displaced by the subsequent operation of stitching the upper to the outer sole, as hereinafter described. We then, before the cement hardens, apply the upper to a last, $l$, turning the edges of the upper over upon the bottom of the last, as usual, and securing them with lasting-tacks, or otherwise, until the cement hardens. The hardening of the cement stiffens the inwardly-turned portions of the upper and makes the form imparted thereto by the lasting operation sufficiently permanent to permit the stitching of the outer sole to the upper, as hereinafter described. We then draw the lasting-tacks and remove the upper from the last, after which we secure to the cement-stiffened edges of the upper an outer sole, $m$, by stitches $s\ s$, made by the McKay or other like sewing-machine. The outer sole may be temporarily secured to the upper by tacks, or otherwise, before the removal of the upper from the last.

It will be seen that the stiffening of the upper after it is lasted enables it to retain its shape while the outer sole is being stitched to it, so that no inner sole is required, and the use of stitches or cords to hold the upper is obviated. The shoe thus made is light and flexible, and its cost is considerably decreased by our improvement.

We claim—

The improved method herein described of making shoes, the same consisting in coating the inner surface of the margin of the upper with cement and thereby securing the margins of the upper and lining together, lasting the upper by bending or flanging the cemented margin over on the last, securing it by independent means, and allowing it to remain thereon until the cement has hardened or stiffened, then removing the upper from the last, and, finally, stitching an outer sole to the cement-stiffened portions of the upper, as set forth.

In testimony whereof we have signed our names to this specification, in the presence of two subscribing witnesses, this 7th day of April, A. D. 1888.

JOSEPH PAINCHAUD.
JOSEPH GODBOUT.

Witnesses:
SOLYME ROGER,
WILLIAM MICHAUD.